Feb. 26, 1952     J. B. KOHLER     2,586,832
APPARATUS FOR WINDING ROLLS
Filed Feb. 26, 1944     7 Sheets-Sheet 2
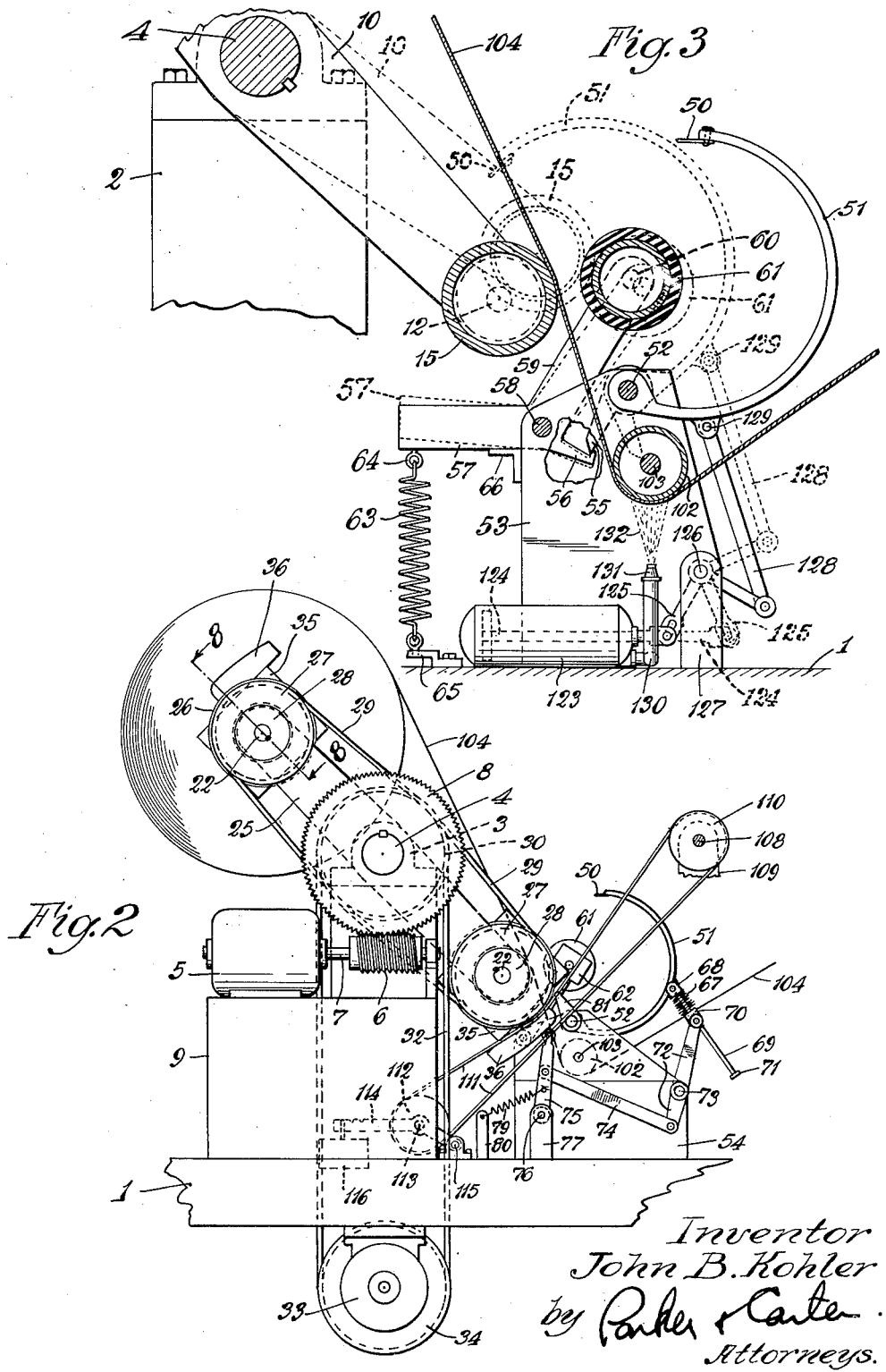
Inventor
John B. Kohler
by Parker & Carter
Attorneys.

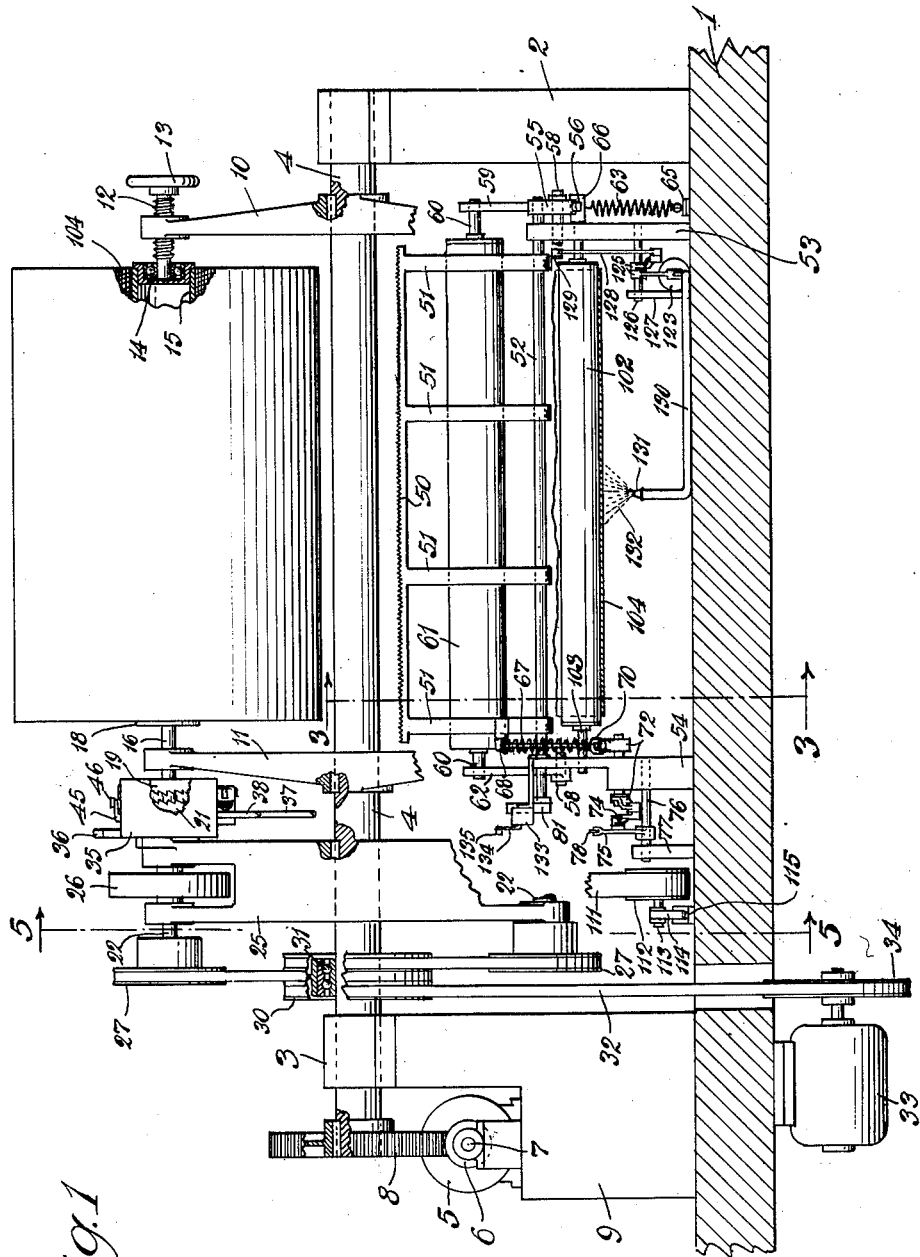

Feb. 26, 1952 J. B. KOHLER 2,586,832
APPARATUS FOR WINDING ROLLS
Filed Feb. 26, 1944 7 Sheets-Sheet 3

Inventor
John B. Kohler
by Parker + Carter
Attorneys.

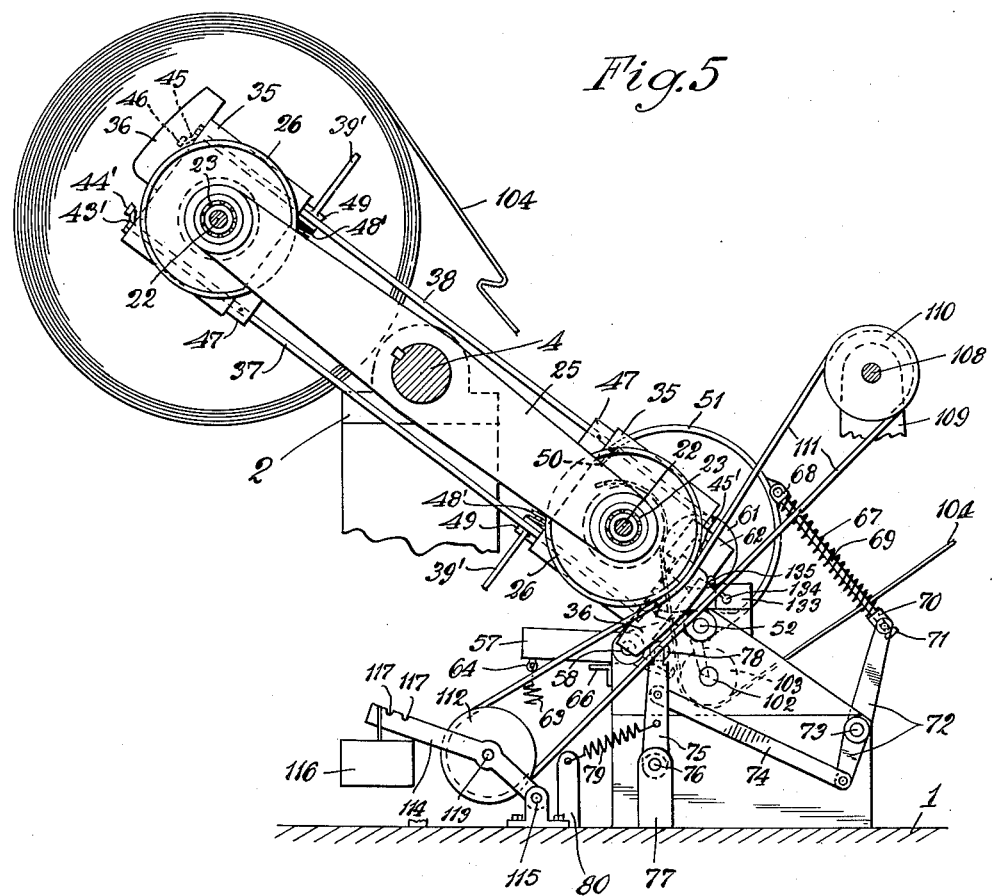
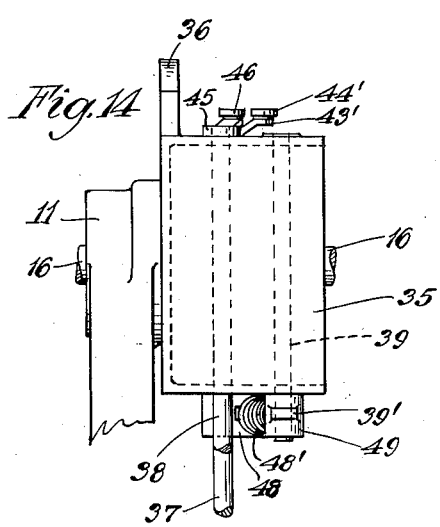

Feb. 26, 1952   J. B. KOHLER   2,586,832
APPARATUS FOR WINDING ROLLS
Filed Feb. 26, 1944   7 Sheets-Sheet 5
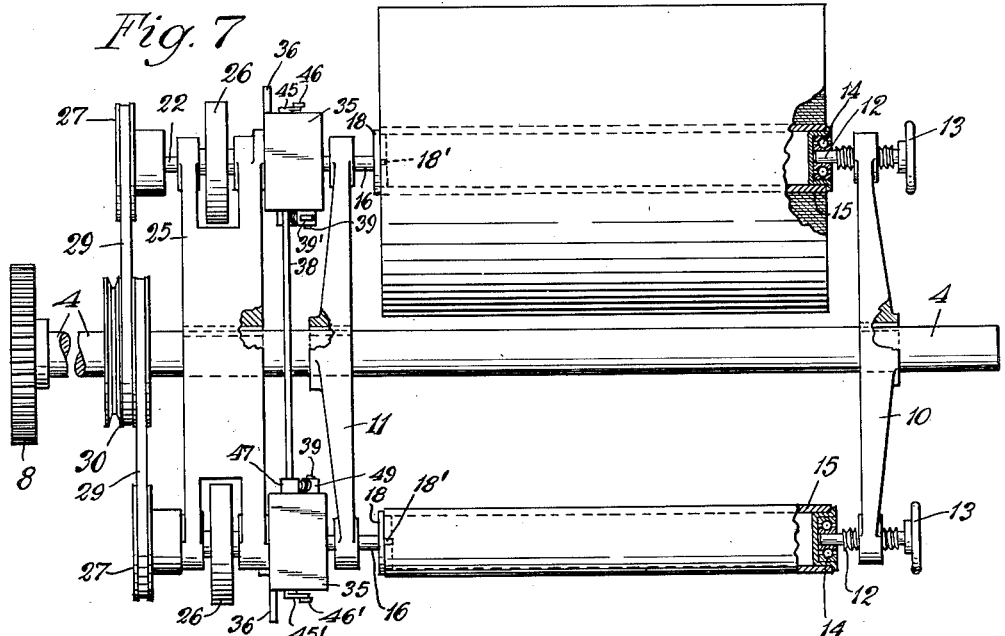
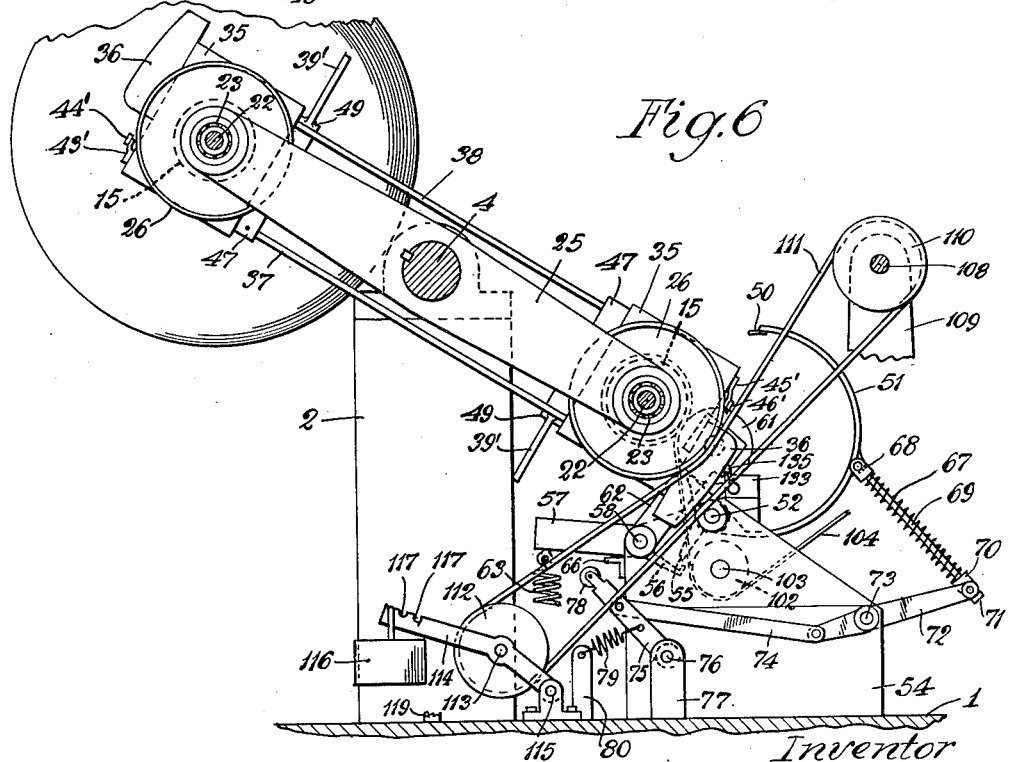
Inventor
John B. Kohler
by Parker & Carter
Attorneys Feb. 26, 1952 J. B. KOHLER 2,586,832
APPARATUS FOR WINDING ROLLS
Filed Feb. 26, 1944 7 Sheets-Sheet 6
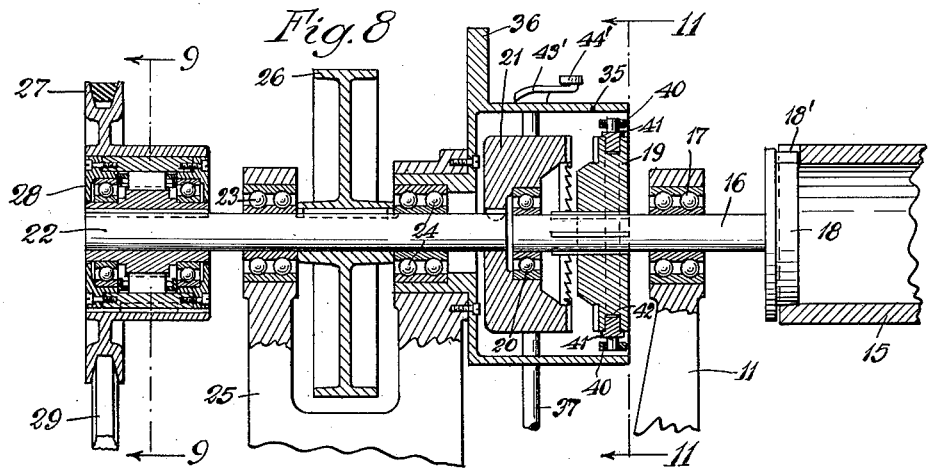
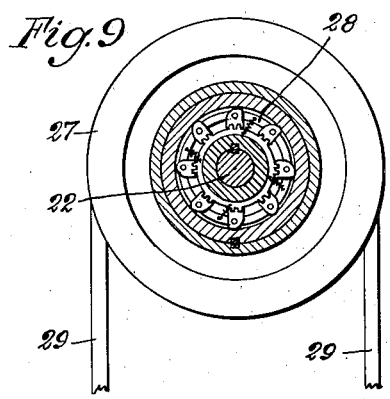
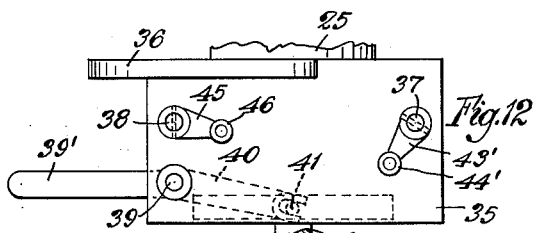
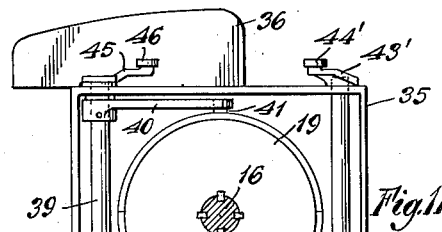
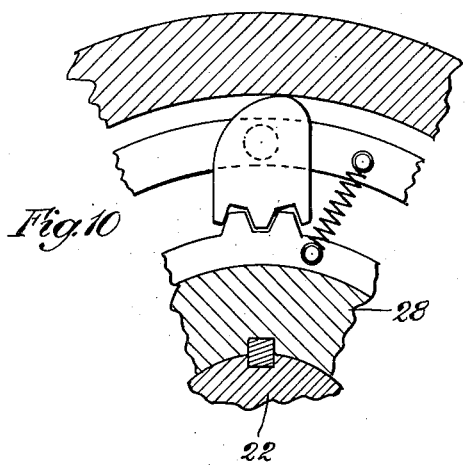
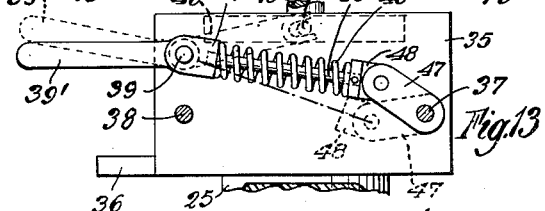
Inventor
John B. Kohler
by Parker & Carter
Attorneys.

Feb. 26, 1952          J. B. KOHLER          2,586,832
APPARATUS FOR WINDING ROLLS
Filed Feb. 26, 1944                    7 Sheets-Sheet 7
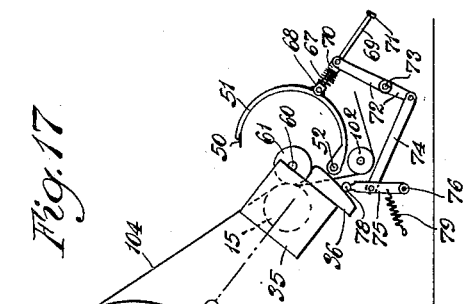
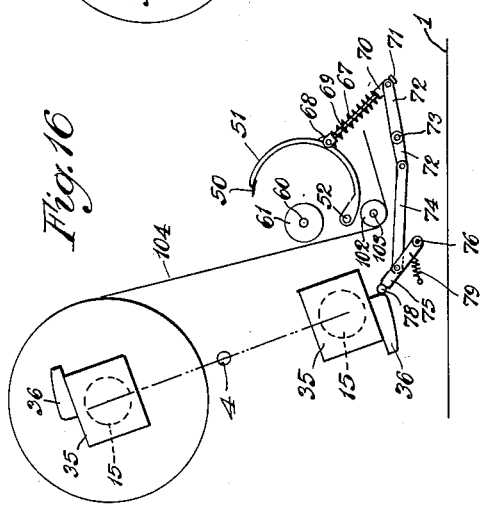
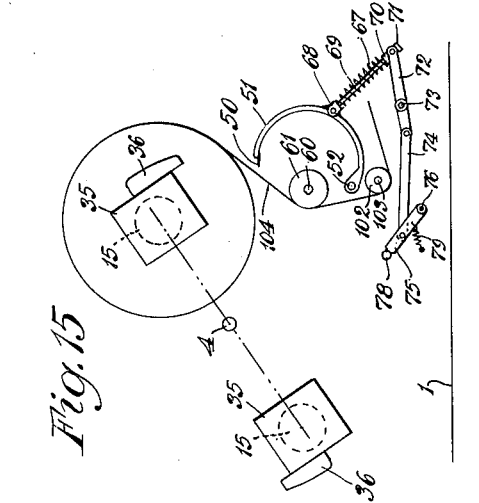
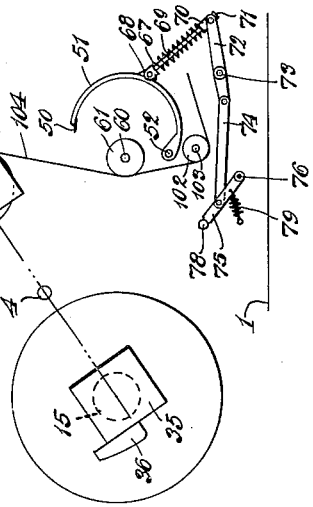
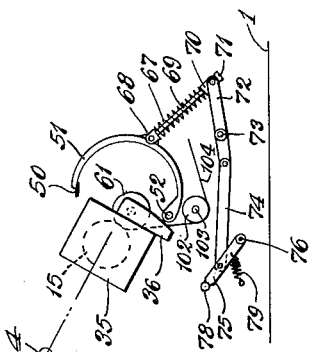
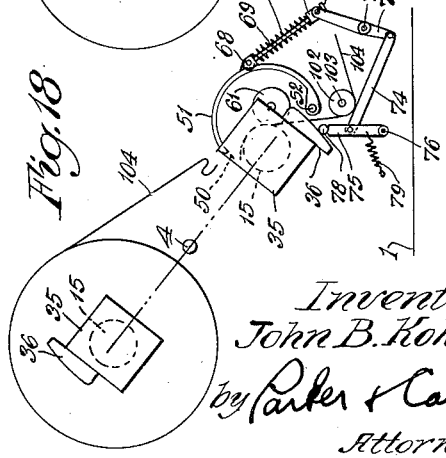
Inventor
John B. Kohler
by Parker & Carter
Attorneys Patented Feb. 26, 1952

2,586,832

UNITED STATES PATENT OFFICE 2,586,832

APPARATUS FOR WINDING ROLLS

John B. Kohler, Chicago, Ill., assignor to The Kohler System Company, Chicago, Ill., a corporation of Illinois Application February 26, 1944, Serial No. 524,032

9 Claims. (Cl. 242—56)

1

This invention relates to a means for continuously winding rolls of material, and it has for one object to provide means for changing the winding material from a completed roll to a fresh roll without interruption in supply or change of speed or tension in the winding material being wound.

It has for another object to provide means for continuously removing a series of completed rolls from the apparatus as they are formed, and for commencing one after the other a series of rolls without interrupting the winding operation.

Another object is to provide means of the type generally indicated above which may be associated with any one of a wide variety of means for making or supplying materials which are to be formed into rolls. The invention, however, is not limited to association with any particular type of material-making or material-supplying means, nor, in fact, is it limited to association with any material-making or supplying means. In the particular form here shown the successive rolls of material are formed upon cores, and it is therefore one object of the invention to provide means suitable for carrying a plurality of cores and to provide means for removably positioning such cores in the machine and for readily removing them from the machine without interrupting any of the winding or rolling operations. Spools, reels, solid or collapsible shafts, or through or stub spindles may be used instead of cores.

Other objects will appear from time to time throughout the specification and claims.

This invention is illustrated more or less diagrammatically in the accompanying drawings, wherein:

Figure 1 is an end elevation of one form of the device with parts in section and parts broken away;

Figure 2 is a side elevation showing the machine of Figure 1 diagrammatically; parts have been omitted to simplify the showing of the operation;

Figure 3 is a sectional detail on an enlarged scale, taken at line 3—3 of Figure 1;

Figure 5 is a sectional view on an enlarged scale, taken at line 5—5 of Figure 1 and showing the knife, in particular, just after the web has been severed;

Figure 6 is a view generally similar to Figure 5, showing the knife in the returned position;

Figure 7 is a plan view of the reel and portions of the reel drive, with parts broken away and parts in section;

2

Figure 4:
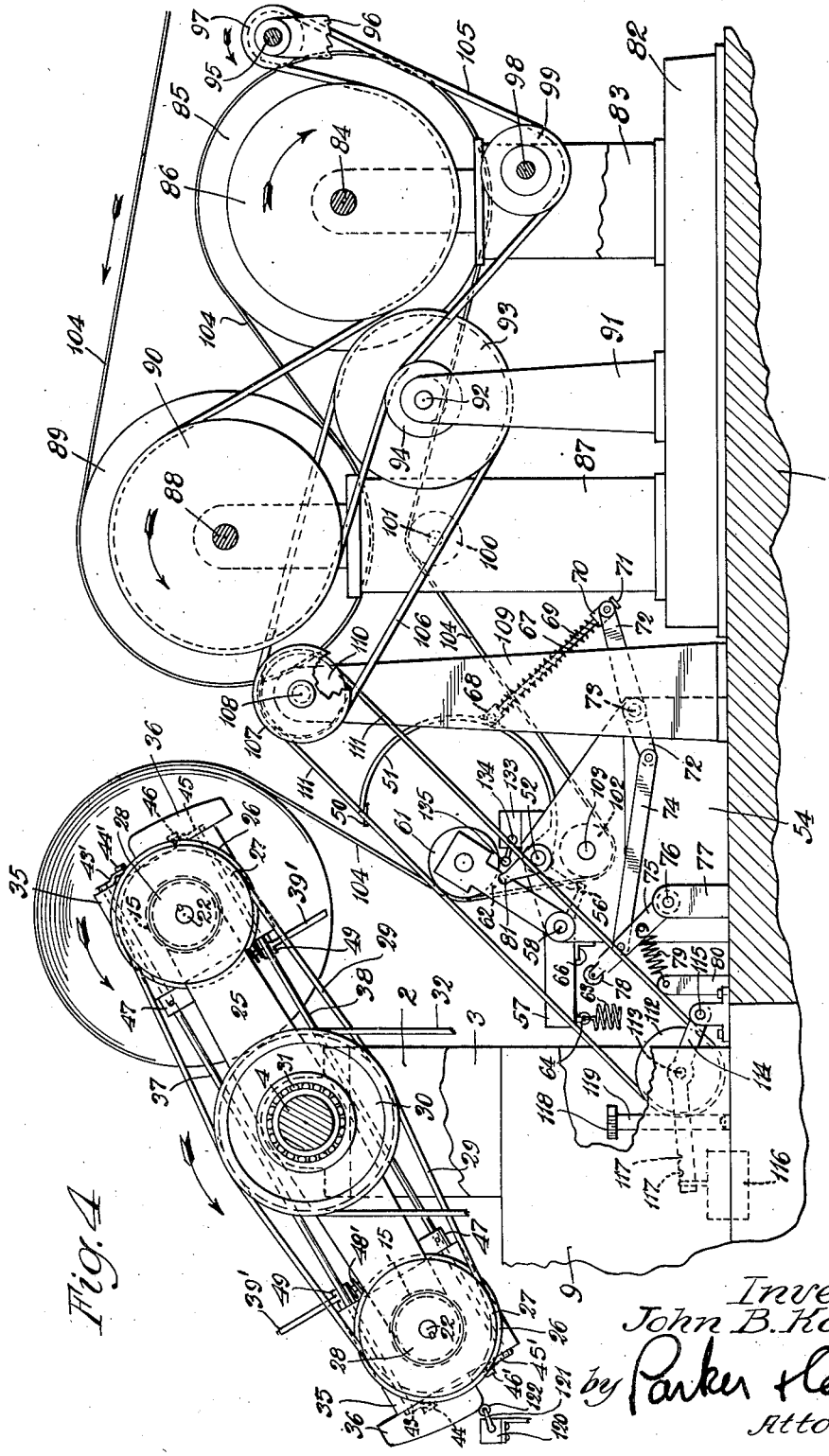
Figure 4 is a side elevation with parts omitted and parts broken away, showing the machine of Figure 1 associated with material-supplying means and showing, in particular, the drive for the speed-up belt of Figure 1.

Figure 8 is a longitudinal section through the reel drive, taken at line 8—8 of Figure 2;

Figure 9 is a transverse sectional detail of the overrunning clutch, taken at line 9—9 of Figure 8;

Figure 10 is an enlarged sectional detail of the overrunning clutch shown in Figure 9;

Figure 11 is a transverse sectional detail taken at line 11—11 of Figure 8 and showing one of the cams and associated parts;

Figure 12 is an end elevation of Figure 11;

Figure 13 is a section taken at line 13—13 of Figure 11, showing the opposite side of the clutch housing shown in Figure 11;

Figure 14 is a side elevation of the housing 35 and associated parts;

Figure 15 is a diagrammatic showing of the machine at substantially the completion of one roll, but before the commencement of the next, with the knife in the uncocked position;

Figure 16 is a diagrammatic showing of the parts rotated between 80° and 90° from the position of Figure 15, and showing the first engagement of the cam 36 with the rocker 78;

Figure 17 is a diagrammatic showing of a further advance in the cycle, with the knife now cocked under pressure for cutting and the material nipped between a fresh core 15 and the pressure roller 61;

Figure 18 is a diagrammatic showing of the parts just after the cutting has taken place;

Figure 19 is a diagrammatic showing of the parts after the completion of severing and the withdrawal of the knife, the cam 36 having left the rocker 78; and Figure 20 is a diagrammatic showing of the parts in the position in which one roll has been fully completed and the second roll is fully commenced.

Like parts are indicated by like characters throughout the specification and the drawings.

The device comprises, generally, means for winding a quantity of material, such as paper, cloth, metal and the like, into successive rolls. In the form shown the rolls are formed on removable cores, and means are provided for successively rolling the material upon one core after another. Means are provided also for joining a new section of material to a new core and for removing a filled core after the desired quantity of material has been wound upon it.

As shown in Figure 1, the machine is supported on any suitable foundation 1. Two main, upright supporting members 2, 3 carry a shaft 4, which is journalled in suitable bearings in the members 2 and 3. The shaft 4 is driven by a motor 5 by means of gearing, which may be of any design, but in the form here shown includes a worm 6 on a motor shaft 7 which meshes with a gear 8 on the shaft 4. The motor is carried on any suitable support, such, for example, as a part 9 of the member 3. Fixed on the shaft 4 is a pair of arms 10 and 11. In the arms 10 is adjustably mounted a pair of spindles 12, 12, which are provided with adjusting hand wheels 13, 13, and upon the inner ends of which are seated bearing assemblies 14, 14 to receive cores 15, 15, upon which the material is rolled or wound.

At the opposite end of the device, to receive the opposite ends of the cores 15, are mounted spindles 16, which are supported in bearing assemblies 17 in the arm 11. The spindle 16 carries a member 18, adapted to receive the core 15. A key 18' locks the member 18 to the core 15, to prevent relative rotation. Slidably mounted on the spindle shaft 16 is the clutch member 19. The outer end of the spindle shaft 16 rests in a bearing assembly 20, which is positioned in a clutch member 21, fixed upon a driving shaft 22. The shaft 22 is carried in bearing assemblies 23, 24, which are themselves mounted in the outer end of an arm 25, which is fixed on the shaft 4. It is to be understood that the two spindle mounting, adjusting and driving assemblies are the same, and only one will be described.

The driving shaft 22 has fixed upon it a pulley 26, and at its outer end carries an overrunning clutch assembly 28, on which is mounted a sheave 27. The details of the clutch form no essential part of the present invention, as such clutches are available on the market today. It is sufficient for the purposes of this invention that an overrunning clutch be provided, so arranged that the shaft 22 can, under certain conditions, rotate more rapidly in the winding direction than the sheave 27. The sheave 27 engages a belt 29, which is itself engaged in a multiple sheave 30, mounted in suitable bearings 31 to rotate upon the shaft 4.

The sheave 30 is rotated by a belt 32, which is itself driven by a motor 33 through a sheave 34. The motor may be given any suitable mounting, but as here shown in Figure 1, it is mounted upon the support or foundation 1.

The clutch members 19 and 21, which are positioned in pairs, one pair for each of the spindle shafts 16, are sometimes clutched and sometimes declutched. The mechanism for operating these clutches to accomplish clutching and declutching will now be described. It is illustrated primarily in Figures 8, 11, 12, 13 and 14.

Each clutch is mounted in a housing 35, one of which is mounted at each end of the arm 25. Each clutch housing carries a cam portion 36. Positioned in each clutch housing and extending through the opposite clutch housing is a shaft 37 or 38. These shafts act as cam follower shafts for the clutches and are carried in the housings 35 and extend across the machine through each such housing. In each housing 35 is mounted a stub shaft 39, and upon each stub shaft 39 is mounted a pair of clutch-operating forks 40, 40. Seated in each of the arms 40 is a pin 41, which is slidably engaged in a groove 42 in the clutch member 19, and by movement of the stub shaft 39, the clutch member 19 is caused to slide with respect to the spindle shaft 16 and thereby is moved into and out of clutching position.

At each end of the shaft 37 are arms 43 and 43', carrying, respectively, rollers 44 and 44', adapted to be contacted by cams in a manner which will be described below.

Correspondingly, upon each rod of the shaft 38 are arms 45 and 45', which carry, respectively, rollers 46 and 46', adapted to be contacted by cams, as will be described below. It will be noticed that the shafts 37 and 38 extend substantially from end to end of the arm 25. And as shown, for example in Figure 4, each of the rollers 44 and 46 is generally opposite one of the cams 36, while each of the rollers 44' and 46' is generally spaced away from one of the cams 36. On the shaft 37 is a link 47 on which is pivoted an abutment 48 on which one end of a spring 48' is mounted. A pin or rounded shaft 48" is secured to the abutment 48 and lies within the spring 48'. The other end of the spring 48 is joined to a member 49, which is fixed to the stub shaft 39. Corresponding links are mounted adjacent the opposite housing 35, but they are operated by the shaft 38.

Since the device is intended to operate substantially continuously from a continuous supply of material, means are provided for severing the material after a suitable quantity has been wound upon the cores. These means include a knife blade 50, which may be of any suitable form, but as here shown the knife blade is provided with saw teeth, as shown in Figure 1. The invention is not limited to a knife of to any particular type of knife blade, and many different sorts and shapes and arrangements of blades, wires and other cutters may be used. As here shown, the knife is preferably carried by a plurality of curved arms 51, which are themselves mounted on a shaft 52. This shaft is carried in suitable bearings in supporting members 53 and 54. The knife 50 and the arms 51 serve to direct the severed end of the material about the new core.

Fixed on the shaft 52, as shown in Figure 3, is a latch 55, adapted to engage a locking member 56 which is secured to a lever arm 57 mounted on a shaft 58, which is journaled in the supporting members 53 and 54. 59 is a roller-supporting arm formed integrally with or fixed to the arm 57 and adapted to carry the journals 60 of a pressure roller 61. A corresponding arm 62 is mounted at the opposite end of the shaft 58 and cooperates in supporting the pressure member 61. A spring 63 is secured, as at 64, to the free end of the arm 57, and at its other end is secured to a base member 65. A stop 66 may be positioned on the member 53 to limit the downward movement of the arm 57 under the influence of the spring 63.

While many different means may be provided for actuating the knife, primarily to move it in the cutting direction, the means shown particularly in Figures 1, 2, 4, 5 and 6 is suitable. This means includes a spring 67 bearing at one end against a link 68, which is pivotally secured to one of the knife arms 51. The spring is positioned about a rod 69 which is free to slide in a link 70. The rod is provided with a head 71 to limit the outward movement of the link 70 with respect to the roll. A lever arm 72 is pivoted to the link 70 and is itself pivoted, as at 73, upon the member 54.

Pivoted to the short end of the lever arm 72 is a link 74 which is also pivoted to a lever 75. The lever 75 is secured to a shaft 76, which is carried in suitable bearings in the member 54 and in a support 77. At its free end the lever 75 carries a roller 78. A spring 79 is secured at one end to the lever 75 and at the other to a support 80 and tends, when free to do so, to rotate the lever 75 downwardly. The roller 78 is adapted to be contacted by the cams 36, as will be described below. Fixed also on the shaft 52 is a cam 81, as shown particularly in Figure 4.

While the machine of this invention may be connected with many different means for supplying material to be wound or rolled, that illustrated diagrammatically in Figure 4 is typical of one such assembly and is adequate for an understanding of the invention.

As there shown, a separate or additional foundation or base 82 may be used. Fixed on or supported from the base 82 is a plurality of roller supports. As shown, there are supports 83 which carry a shaft 84, upon which a roll 85 is mounted. Also mounted on the shaft 84 is a pulley 86. A second supporting means 87 carries a shaft 88, upon which a roll 89 is mounted and upon which a pulley 90 is also mounted. The rolls 85 and 89 are typical of the end dryer drums of a paper processing machine. A third supporting means 91 is carried on the base 82 and supports a shaft 92 to which is secured a large pulley 93 and a smaller pulley 94. A driving shaft 95 is carried on members 96 and has fixed to it a driving pulley 97. Journaled also on the supports 83 is a shaft 98 upon which is mounted an idler pulley 99. A material-supporting roller 100 is carried on a shaft 101, which is supported for rotation in the supporting members 87. A second material-guiding roller 102 is carried on a shaft 103, which is itself mounted for rotation upon the members 53 and 54. The material 104 moves in the direction of the arrow of Figure 4, passes about the roll 89, the roll 85, the guide roller 100 and the final guide roller 102, and then passes over to the roll which is being formed on one of the cores 15.

The shaft 95 carrying the pulley 97 is driven from any suitable source. A belt 105 engages the pulley 97 and successively the pulleys 86, 90, 94 and 99 and thus drives directly the rolls 85 and 89. Another belt 106 engages the pulley 93 and the pulley 107, which is mounted on a shaft 108 carried by supports 109. An additional pulley 110 is also mounted on the shaft 108 and engages a speed-up belt 111. The speed-up belt passes at its opposite end about a pulley 112 which is mounted on a shaft 113. The shaft 113 is carried on a lever arm 114 which is pivoted on any suitable base, as at 115. At its free end the lever arm 114 has adjustably mounted upon it a weight 116. The effect of the weight and the lever arm is to keep the belt taut. Many different ways of adjusting the tension may be used, and the simple one shown, which includes the lever arm and the notch 117 in the lever arm, is one suitable means for tensioning the belt. The effect of the belt 106 and the proportions of the pulleys which drive it, and of the pulley 26 which is driven by it at the time of roll change, results in giving to the empty core 15 a surface speed about 10% greater than the speed of the material 104 as it moves to the winding or changing assembly.

Shown primarily in Figure 4 is a cam 118 which is carried on a support 119. The cam is adapted to contact the rollers 44' and 45' to operate the clutch mechanism in the manner which will be described below.

120 is a switch having a switch arm 121 carrying a roller 122 adapted to be contacted by the cam 36. The switch controls the operation of the motor 5. The switch has for one purpose to stop rotation of the arms 10 and 11 when the roll change is completed and it is necessary to remove a completed roll from them and to insert a new core. Manually controlled switch means, not shown, may be inserted in the motor circuit of the motor 5 so that its operation can be manually recommenced after a filled roll has been removed and a new core been put in position. Instead of a manually controlled switch, automatic means might be used for operating the switch in the circuit of the motor 5. If automatic means are used, they may be of any nature. Two such automatic means are a lineal footage counter or a rider roll, responsive to the size of winding roll, and of course other automatic means are obvious.

Many different means may be provided for causing a new strip or section of material to be joined to a new core when a new roll is to be commenced. One such means includes an apparatus for applying an adhesive to that portion of the web or material which is to be joined to the new core Such an apparatus is shown diagrammatically in Figures 1 and 3. As shown in Figure 3, a new core 15 is in place and the material 104 is about to be severed by the knife 50. The knife, in severing the web, moves from the full line position of Figure 3 to the dotted line position and in so doing severs the web or material. At the same time it operates an adhesive spraying means. That illustrated in Figures 1 and 3 is merely a diagrammatic showing of one possible form. As shown, this includes an adhesive tank or container 123 which includes a plunger 124 which extends outside of the housing of the member 123 and is actuated by a bell crank lever 125 pivoted at 126 on a support 127. The opposite end of the bell crank lever is pivoted to a link 128 which is itself pivoted, as at 129, to one of the knife arms 51. A conduit 130 leads from the container 123 to a nozzle 131 through which adhesive is sprayed, as at 132, as shown in Figures 1 and 3, upon the lower side of the web section which is about to be joined to the core 15.

Manual means have been described for completing the circuit of the motor 5 so as to start rotation of the core assembly. Similarly, manual means may be provided for clutching or declutching the individual drives of the individual cores. One such means, as shown in Figures 4, 11, 12 and 13, comprises handle-like members 39' formed with or attached to the members 49, one of which is fastened to each of the stub shafts 39.

The speed at which the web 104 is fed to the winding assembly is generally constant, and ordinarily the web will be fed to the machine shown herewith from a source of manufacture or a source of supply at a constant speed. The invention, however, is not limited to any particular means for feeding the web to the mechanism shown herewith.

A switch housing 133 as shown in Figures 1 and 6, encloses a switch. An arm 134 is connected to the switch and may carry a roller 135. This roller is contacted by the cams 36 at a suitable point in the cycle of the device— namely, when the cutting of the web or material 104 takes place. When the switch 133 is actuated, the motor 5 is stopped for approximately ten seconds The switch 133 operates a time relay which is not shown in the controlling circuit of the motor 5, which automatically completes the circuit and cuts in the motor 5 again after a predetermined interval, which may be approximately eight or ten seconds. This is a sufficient time for the paper to get started on the new core 15, and for the winding motor 33 to accelerate from the revolutionary speed of the large roll to the revolutionary speed of the fresh core.

Although I have shown an operative form of my invention, it will be recognized that many changes in the form, shape and arrangement of parts can be made without departing from the spirit of the invention, and my showing is therefore to be taken as, in a sense, diagrammatic.

In particular, although the machine shown herewith provides only two roll or two core positions, it might obviously, without invention, be rearranged to provide a greater number of roll or core positions.

Some of the parts used in the mechanism are readily available on the market today, and their structural details and manner of operation are well-known. For that reason they are neither shown nor described in full detail herewith. Among such features is the winding motor 33. This motor may be associated with or form a part of a drive of such nature that it causes the winding of the material under uniform or controllable tension, regardless of changes in the roll diameter. Among such devices now available on the market are the Reliance Electric Rewind Drive, the Oilgear Hydraulic Winder Drive, and a slip belt or slip clutch drive connected to the machine drive. All of these drives are well-known in the art and fully understood by those experienced in the needs for and uses of such uniform tension driving or winding devices.

Similarly, the overrunning clutches are of standard designs and many different sorts of overrunning clutches could be readily substituted for those shown, which are shown only sufficiently to indicate their general construction. The nature of the overrunning clutches is such that the sheave 27 will drive the shaft 22 in the direction necessary to wind the web material upon the core 15, but when the shaft 22 is driven at a greater rate of speed than the sheave 27, as, for example, by the speed-up belt 111 acting on the pulley 26, as described below, the shaft 22 will, in effect, "free-wheel" with respect to the sheave 27. The actual construction of such overrunning clutches is immaterial to the invention, and a number of clutches, all of them suitable in this connection, are available on the market.

Although means are provided for applying adhesive to the web or material as it is first wound upon the new core, it is to be understood that other means may be used for causing the material to be directed about a new core, and the invention is not limited to the use of adhesive nor to the use of any particular adhesive-applying means. In this connection, it is also to be noticed that with certain classes of webs or materials a core is not necessary, and the invention is, therefore, not limited to the use of a core, although for many classes of webs or materials a core is a convenient means for initiating the formation of a roll and for handling the roll after it has been completed.

The limit switch 133 may be of many different arrangements and details, none of which is illustrated in detail, because the invention is not limited to a particular switch or switch circuit. Such a switch is provided for the purpose of stopping the reel after the material has been changed to a new core, and whatever its nature, it preferably includes a time delay circuit for the rotation motor 5, which allows a sufficient period to permit acceleration of the motor 33 to the higher speed necessary for winding on the small core, instead of that suitable for rotating the large completed or nearly completed roll.

Figures 15 to 20, inclusive, have been arranged on a separate sheet in order to illustrate simply and diagrammatically the general cycle of operations, and they show the position of the reel arms at six successive positions throughout the cycle. They show also the position of the cams 36 and the knife and the knife spring, together with the linkage which controls the compression of the spring and the movement and setting of the knife in the successive positions which it and its associated parts assume in the completion of a roll and the severing of the material which has been wound upon the roll and the starting of a new roll.

The machine of this invention is illustrated herewith as arranged to form rolls of relatively thin, flat and extended material, such, for example, as paper, fabric, foil or other forms of metal or any other material. For some purposes the material shown in the drawings as being wound by the machine is called "web." However, where the expression "web" occurs in the specification and claims, it is not to be limited to a flat, thin, widely extended material. Since the machine may be used for forming rolls of web, however formed, and of whatever material, and since it may also be used for forming rolls of wire, thread, rods, thin tubes and the like of any material, the expression "web" is to be understood as used herewith as applying to any or all of such materials and is not to be understood as a limiting word having the exclusive meaning of a flat, thin, wide mass of material. The material which is wound may have any form or shape.

In the conception of the machine, as shown and described herein, use is made of a primary winding drive which is selectively connected to the successive roll-forming positions, as successive rolls are formed, and an auxiliary drive which comes to play during the transitional state of changing the web or other material from one winding position to another. The main drive is disconnected from the full roll position, at the time of changing the web, and is reconnected to the new winding position very shortly thereafter through a combination of clutching means.

An alternate constuction, within the general scope of this invention, comprises a machine in which two principal driving means of identical construction are used, one connected to each roll-forming position. Thus, one can come into play prior to the time of change, upon the completion of one roll, to accelerate the fresh core or roll support to speed and can continue to act on this core of the fresh roll through the full cycle of winding this new roll. The other drive, being directly connected to the filled roll position or support, is stopped at the time of change. Its operation in the next cycle is the same as the other drive, as the two drives reverse their functions in each successive cycle. These drives might consist of motors mounted on the reel arms and directly connected to the spindle shafts or roll supports and would eliminate all clutches.

A further alternate construction of the machine comprises a two high reel stand which carries spindle shafts or other roll supports on brackets so that they are removable and includes two winding drives, one connected to each roll-forming position, as stated in the foregoing paragraph. The web or material is led to the machine from one side at a position approximately midway between the two spindle shafts. Two pressure roll and knife assemblies are provided which are movably mounted so that they may be used to move the web against the empty spindle or roll support and, when the members engage, will go through the cycle substantially as described in connection with the machine shown in the drawings. Two adhesive-supplying mechanisms would also be present. The adhesive-supplying means and the two pressure roll and knife assemblies would be used alternately. The adhesive means may be timed to operate to glue the end of a completed roll in place.

The use and operation of this invention are as follows:

For purposes of illustration, it is assumed that material of suitable length is being supplied from the direction of the arrow shown in Figure 4. It is also assumed that a core 15 is in position between the arms 10 and 11. The material is attached to that core, and the clutch controlling the drive to that core is clutched manually, or otherwise, so that the core is rotated, and this rotation continues until the roll has received approximately the desired total quantity of material. The motor 33 serves, during this portion of the cycle of operations, to rotate the core which is being filled. When it is desired to terminate the filling of one core—that is to say, the formation of a given roll of material—the motor 5 is started by any means and the core assembly, including the arms 10, 11 and associated parts, rotates in the direction of the arrow shown in Figure 4.

The assembly then rotates until the roller 46′ contacts the cam 118 and engages the clutch for a new empty core which has been previously put in position between the spindles 12 and 16. This commences the rotation of the empty core or spool.

The rotation of the total assembly continues. As this rotation of the total assembly continues in the counter-clockwise direction, the left-hand cam 36 contacts the roller 78 and forces the linkage which controls the spring 67 generally to the position shown in Figure 2, and places that spring under compression. The latch member 55 still holds the knife in compression in the full line position of Figure 3. As this action is taking place, the pulley 26 is brought into contact with the speeder belt or speed-up belt 111, and at this point it tends to drive the empty core slightly above the speed of the web or other material which is being supplied to the almost completed roll and is about to be transferred to the new or empty core or other roll support for the formation of a new roll.

As the rotation of the total assembly continues, the empty core engages the moving web 104, and moves that web material into contact with the pressure roller 61, and as this movement further continues, the roller 61 is moved from the full line position of Figure 3 to the dotted line position of that figure, and thus unlatches the member 55 which controls the cutting movement of the knife. The knife is then forced by the spring 67 from the full line position of Figure 3 to the dotted line position of that figure, thus severing the web 104 at a point beyond the empty core 15 and beyond the pressure roller 61.

The system is so designed that slip may occur between the pulley 26 and the belt 111, when the new core 15 is restrained from turning at full speed by the commencement of winding of the web 104 about the core 15. At this portion of the cycle of operations the overrunning clutch on the spindle shaft 22 of the empty core comes into play and the core is rotated by the speed-up belt 111 more rapidly than would have been the case had its rotation been accomplished by its normal driving means alone through the clutch assembly on its spindle shaft 16. The speed-up belt continues in action until the motion of the assembly is resumed and carries the core out of contact with the pressure roll and the pulley 26 out of contact with the speed-up belt. This is after the winding motor has picked up the load through the overrunning clutch. Thus both drives are active together for a short period. The resumption of rotation of the total assembly is initiated by the relay mechanism actuated by the switch 133, which closes the circuit of the motor 5.

One reason why the speed-up belt is necessary may be explained as follows: It comes into operation before the web has been severed after the completion of a roll, bringing the new core to web speed or slightly above. As soon as the load upon the motor 33 which was driving the completed roll has been removed by the severing of the web 104, the motor will accelerate automatically until such time as its speed at the output point of the sheave 27 is in synchronism with the speed of the new core 15, whereupon it automatically picks up the winding load through the overrunning clutch. During the time that the new portion of the web is being positioned about the new core, it is being wound about the core by the belt 111, acting on the pulley 26.

At this time the web is pinched between the empty core and the pressure roller 61 and since the empty core is rotating, being driven by the belt 111 and the pulley 26, the web continues to be drawn from the source of supply, under tension even though it has been severed from the portion of material mounted on the completed roll. At the same time that the cutting operation takes place, the adhesive-supplying means is actuated and a jet of adhesive, as shown in Figures 1 and 3, is discharged against the under surface of the entering portion of the web—that is to say, against that portion of the web which is to be engaged with the empty core 15. The invention is not limited to the use of an adhesive, and other means for directing the severed end of the material about and for starting the winding of the material upon the new roll support are contemplated and could be used without departing from the spirit of this invention. As the knife moves, the shaft 52 which carries the knife arms 51 also actuates the cam 81 secured to it and contacts the roller 44 to declutch the driving means for the completed roll of web.

After the operation described just above and before the new core 15 has moved away from the pressure roller 61, one of the cams 36 comes in contact with the roller 135 to actuate the switch 133 which temporarily stops the motor 5 and therefore temporarily stops rotation of the total assembly. But during this time the new core continues to be rotated because its driving clutch remains clutched, and it is driven by the belt 111 driving the pulley 26. As the rotation of the total core assembly has brought the new core toward the position at which the knife is actuated to cut the web, the pulley 26 has come into contact with the speed-up belt 111, and it is therefore being driven by that belt at this time.

Any of the winding systems which may be used with the motor 33 have one common characteristic—namely, that when the load is removed, the drive accelerates very rapidly to its full speed. Since the drive of the motor 33 to the completed roll is disconnected by the action of the cam attached to the cutting knife, which cam acts upon the clutch throwout lever, the motor 33 will immediately accelerate. Before this time the clutch which operates the drive for the new core has been engaged, and the respective sheave 27 which is, of course, connected to the winding motor 33, is being driven at its proportional speed, is running slower than the shaft 22. Therefore the overrunning clutch in the drive for the new core is "free-wheeling." Therefore, as the motor 33 accelerates, the sheave 27 from which the new core is driven increases in speed until it attains synchronism with its shaft 22, at which time it picks up the load of winding the web 104 upon the new core 15. From this time until the rotation of the total assembly takes the pulley 26 out of engagement with the belt 111, both the main and the auxiliary or speed-up drives are acting upon the new core. The time delay element is so set that the time of this action, during which both drives are acting upon the new core, is slightly longer than the time required for the winder drive—that is to say, for the motor 33—to accelerate to full speed.

As soon as the cam 36 leaves the roller 78, the spring 79 is free to move the lever 75 counterclockwise and to withdraw the knife and its associated linkage to the full line position of Figure 3. Further rotation of the total assembly carries the new core 15 out of engagement with the pressure roller 61. When that point is reached, the spring 63 is then free to restore the pressure roller assembly to the full line position of Figure 3, and at the same time it moves the latch 56 into engagement with the latch 55 and thus the knife and the adhesive-supplying assemblies are held in a stationary position until they are reactuated for the next roll change. The continuing rotation of the total assembly carries the pulley 26 out of engagement with speed-up belt 111.

After the knife has been reset, the rotation of the total assembly continues until the parts are restored approximately to the position of Figure 4, at which time one of the cams 36 contacts the switch 122, breaking the circuit to the motor 5 and stopping rotation of the total assembly. During this time, after the total assembly has stopped, the motor 33 continues to rotate that new core and to draw the web onto the core for the formation of a new roll of web. A certain time is required to complete this roll, and during that time the previously completed roll is removed and a new or empty core is put in place. The removal of the roll is accomplished by rotating the spindle 12 by means of the handle 13. The threads on the spindle 12 are effective to back off the spindle to permit the core and the roll which it carries to be removed. When it has been removed a new or empty core is put in place and the spindle 12 is returned to the engaging position by rotation of the handle 13.

As soon as the new core has been sufficiently filled—that is to say, as soon as a new roll of web of sufficient size has been accumulated on the new core—the circuit of the motor 5 is completed by the operation of a switch, not shown, and the cycle of operations above described is repeated. Any switch means may be used for this purpose—manual or automatic—and the invention is not limited to the used of any particular switch or circuit-completing means in this connection.

This cycle may be repeated indefinitely so long as the machine which supplies material to be wound continues to operate. If the handles 39' are furnished, the motion of any individual drive for any individual core may be manually started or stopped. One reason for such manual stopping is upon the occurrence of a break or to make a repair or to make an inspection. Obviously, of course, the arms 43, 43', 45 and 45' can be used as handles for clutching or declutching a core drive.

Manual engagement of the clutches, prior to the initiation of the roll change cycle, may be used instead of the cam 118.

As above mentioned, some materials can be wound without any cores, and some will require cores, and a variety of supports. The invention is not limited, therefore, to any particular roll centering or carrying means, and such expressions as "means for carrying rolls" are to be understood as meaning any means, members or devices upon which rolls are carried, held or supported during formation.

Typical of terms which may be applied to means for carrying or supporting the rolls of material during formation are the following: "spindle," "shaft," "core of any material," "spool," "mandrel," or "reel." The particular expression used in the specification and claims is to be read as applying to any such members or to all of them.

I claim:

1. In combination in a winding device, means defining a frame, means in said frame for carrying a plurality of rolls of web material during formation, and selective means for driving said rolls during their formation, a knife for severing said web, and adhesive-applying means, means for operating said adhesive-applying means substantially coincidentally with movement of said knife, said adhesive-applying means being adapted to apply adhesive to said web upon the commencement of a new roll, and auxiliary means for driving a roll during the early state of its formation.

2. In combination in a winding device, means defining a rotatable frame, means in said frame for supporting a plurality of rolls of web material during formation, and selective means for rotating said rolls during their formation, means for rotating said frame bodily, a knife for severing said web, and adhesive-applying means, means for operating said adhesive-applying means substantially coincidentally with movement of said knife, said adhesive-applying means being adapted to apply adhesive to said web upon the commencement of a new roll, and auxiliary means for rotating a roll during the early state of its formation, said means comprising a driving member and a part mounted to rotate with said roll, said part contacting said driving member during the initial stages of the formation of a roll, and adjustable means for applying tension to said driving member.

3. In combination in a web roll-forming means, a main shaft, a plurality of roll-carrying arms fixed to said shaft, means for removably carrying rolls on said arms, clutch-operating means mounted for movement with said arms, means for driving said rolls, a plurality of pulleys, one for each of said rolls, a clutch between each roll and its pulley, means for rotating the said main shaft, and controlling means for said main shaft rotating means, adapted automatically to stop the rotation of said main shaft at a predetermined point, a knife adapted to sever the web upon the substantial completion of a roll, and means responsive to rotation of said shaft for actuating said knife to cause the same to sever said web upon the substantial completion of a roll, and auxiliary means for driving a roll during its initial stage of formation, said means including a belt, and adjustable means for applying tension to said belt, said pulleys being adapted to contact said belt for a limited period during the cycle of operation.

4. In combination in a winding device, a plurality of means for carrying rolls, said means comprising cores or spindles, means for supporting said rolls and their carriers comprising a rotatable frame, and means for supporting said frame, means for selectively driving said rolls for the purpose of winding material thereon, means for rotating said frame and bringing the material to be wound into selective contact with said roll-carrying means, means for severing the winding material between said point of contact and a substantially completed roll, means for removably holding the roll carrier in said frame, and auxiliary means for driving an empty roll carrier at a speed greater than its later speed during the period in which the winding action is being changed from a roll carrier of a completed roll to the roll carrier of a new roll.

5. In combination in a winding device, a plurality of means for carrying rolls, means for selectively driving said rolls for the purpose of winding material thereon, said driving means including means for disengaging the drive from any of said rolls and means for engaging such drives to any of said rolls, means for bringing the material to be wound into selective contact with said roll-carrying means, means for severing the winding material between said point of contact and a substantially completed roll, means for pressing said material against said roll carrier before severing, and means for causing the severed material to be directed around an empty roll carrier with which it is in contact, and auxiliary means for driving said empty roll carrier during the period in which the winding action is being changed from the roll carrier of a completed roll to said empty roll carrier.

6. In combination in a winding device, a plurality of means for carrying rolls, means for selectively driving said rolls for the purpose of winding material thereon, said driving means including means for disengaging the drive from any of said rolls and means for engaging such drives to any of said rolls, means for bringing the material to be wound into selective contact with said roll-carrying means, means for severing the winding material between said point of contact and a substantially completed roll, means for pressing said material against said roll carrier before severing, and means for causing the severed material to be directed around the empty roll carrier upon which it is to be formed, and auxiliary means for driving said empty roll carrier during the period in which the winding action is being changed from a roll carrier of a completed roll to said empty roll carrier.

7. In combination in a winding device, a plurality of means for carrying rolls, means for selectively driving said rolls for the purpose of winding material thereon, said driving means including means for disengaging the drive from any of said rolls and means for engaging such drives to any of said rolls, means for bringing the material to be wound into selective contact with said roll-carrying means, means for severing the winding material between said point of contact and a substantially completed roll, means for pressing said material against said roll carrier before and after severing, means for removably holding the roll carrier in place, and auxiliary means for driving the empty roll carrier during the period in which the winding action is being changed from a roll carrier of a completed roll to the roll carrier of a new roll.

8. In combination in a winding device, a plurality of means for carrying rolls, means for selectively driving said rolls for the purpose of winding material thereon, said driving means including means for disengaging the drive from any of said rolls and means for engaging such drives to any of said rolls, means for bringing the material to be wound into selective contact with said roll-carrier means, and means for pressing said material upon said roll carrier before and after severing, means for severing the winding material between said point of contact and a substantially completed roll, and means for causing the severed material to be directed around the empty roll carrier with which it is in contact, means for removably holding the roll carrier in place, and auxiliary means for driving the empty roll carrier during the period in which the winding action is being changed from a roll carrier of a completed roll to the roll carrier of a new roll.

9. In combination in a winding machine, a movable assembly and means for moving it, a plurality of roll supports mounted in said assembly, and means for selectively driving said roll supports, means for supplying material to be wound upon said supports, means for selectively bringing said material into contact with a support, means for severing said material, and means for directing the severed end of said material about a support, an additional drive for said supports, said drive becoming effective upon said supports generally just before the material is severed, and means for exerting pressure upon said material against said support before severing and during the initial stage of the formation of a roll.

JOHN B. KOHLER.

REFERENCES CITED

The following references are of record in the file of this patent:

UNITED STATES PATENTS

| Number | Name | Date |
|---|---|---|
| 411,608 | Pope | Sept. 24, 1889 |
| 542,034 | Simpson | July 2, 1895 |
| 601,495 | Cornell et al. | Mar. 29, 1898 |
| 1,154,301 | Fogarty | Sept. 21, 1915 |
| 1,194,248 | Smith | Aug. 8, 1916 |
| 1,248,542 | Pope | Dec. 4, 1917 |
| 1,328,431 | Hudson | Jan. 20, 1920 |
| 1,882,012 | Hires | Oct. 11, 1932 |
| 1,894,281 | Parsons | Jan. 17, 1933 |
| 1,976,641 | Vernon et al. | Oct. 9, 1934 |
| 1,979,334 | Lyth | Nov. 6, 1934 |
| 2,020,118 | Kellett et al. | Nov. 5, 1935 |
| 2,029,446 | Schueler | Feb. 4, 1936 |
| 2,030,684 | Coleman | Feb. 11, 1936 |
| 2,142,777 | Berry | Jan. 3, 1939 |
| 2,332,371 | Corbin et al. | Oct. 19, 1943 |
| 2,357,976 | Roesen | Sept. 12, 1944 |
| 2,385,691 | Corbin et al. | Sept. 25, 1945 |
| 2,385,692 | Corbin et al. | Sept. 25, 1945 |